US012654547B2

(12) United States Patent
Berhorst et al.

(10) Patent No.: US 12,654,547 B2
(45) Date of Patent: Jun. 16, 2026

(54) ACCELERATOR PEDAL COMPRISING A ROTATIONAL POSITION SENSOR WITH A ROTATIONAL AXIS SENSOR AND A PIVOTAL ACTUATION ELEMENT WITH AN ACTUATION ROTATIONAL AXIS

(71) Applicant: Hella GmbH & Co. KGaA, Lippstadt (DE)

(72) Inventors: Jann Berhorst, Borchen (DE); Oliver Budde, Borchen (DE); Matthias Kuge, Paderborn (DE); Sascha Kuhlmann, Geseke (DE); Clemens Maßmann, Wadersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 44 days.

(21) Appl. No.: 18/781,596

(22) Filed: Jul. 23, 2024

(65) Prior Publication Data

US 2025/0050733 A1     Feb. 13, 2025

Related U.S. Application Data

(63) Continuation of application No. PCT/EP2023/050587, filed on Jan. 12, 2023.

(30) Foreign Application Priority Data

Jan. 27, 2022     (DE) ..................... 10 2022 101 846.6

(51) Int. Cl.
B60K 26/02          (2006.01)
G05G 1/30          (2008.04)
(Continued)

(52) U.S. Cl.
CPC .............. B60K 26/02 (2013.01); G05G 1/38 (2013.01); G05G 5/04 (2013.01); G05G 2505/00 (2013.01)

(58) Field of Classification Search
CPC ........ B60K 26/02; B60K 26/021; G05G 1/30; G05G 1/38; G05G 1/44; G05G 5/04; G05G 2505/00
See application file for complete search history.

(56) References Cited

U.S. PATENT DOCUMENTS 6,580,352  B1 *   6/2003  Pino ....................... F02D 11/106
                                                      338/153
10,220,703  B2 *   3/2019  Viethen ................ B60K 26/021
(Continued)

FOREIGN PATENT DOCUMENTS

CN          114008556  A   *   2/2022   .............. G05G 5/03
DE          10121317  A1 *  11/2002   .............. G05G 1/30
(Continued)

OTHER PUBLICATIONS

Machine translation of FR 2748831 A1 obtained on Oct. 29, 2025.*

*Primary Examiner* — Adam D Rogers
(74) *Attorney, Agent, or Firm* — Husch Blackwell LLP

(57)          ABSTRACT

An accelerator pedal includes a rotational position sensor, and a pivotal actuation element coupled to a rotor in the rotational position sensor to rotate the rotor in the rotational position sensor in relation to a stator in the rotational position sensor. The actuation element is pivotally supported such that it can pivot about am actuation rotational axis. The rotor in the rotational position sensor is rotationally supported such that it can rotate about a sensor rotational axis. The actuation rotational axis and the sensor rotational axis are different axes, and there is a gearing between the actuation element and the rotor that converts a pivoting of the actuation element into a rotation of the rotor.

7 Claims, 17 Drawing Sheets

(51) Int. Cl.
    *G05G 1/38*         (2008.04)
    *G05G 5/04*         (2006.01)

(56)             References Cited

U.S. PATENT DOCUMENTS

| | | | |
|---|---|---|---|
| 10,248,152 B2 * | 4/2019 | Kim | G05G 5/05 |
| 11,225,141 B2 * | 1/2022 | Ridder | B60K 26/021 |
| 11,225,226 B1 * | 1/2022 | Kim | B60K 26/02 |
| 11,617,682 B2 * | 4/2023 | Charles | G06F 3/0334 |
| | | | 700/301 |
| 2004/0149070 A1 | 8/2004 | Solta | |
| 2004/0237700 A1 | 12/2004 | Wurn | |
| 2014/0123802 A1 * | 5/2014 | Kim | G05G 1/30 |
| | | | 74/513 |
| 2018/0105038 A1 | 4/2018 | Viethen | |
| 2021/0237569 A1 | 8/2021 | Ridder et al. | |
| 2024/0231411 A1 * | 7/2024 | Berhorst | B60K 26/04 |

FOREIGN PATENT DOCUMENTS

| | | | | |
|---|---|---|---|---|
| DE | 102012202313 A1 * | 8/2013 | | G05G 1/44 |
| DE | 102012112514 A1 * | 6/2014 | | F16H 19/001 |
| DE | 102008003296 B4 | 4/2016 | | |
| FR | 2748831 A1 * | 11/1997 | | G05G 1/305 |

* cited by examiner

ACCELERATOR PEDAL COMPRISING A ROTATIONAL POSITION SENSOR WITH A ROTATIONAL AXIS SENSOR AND A PIVOTAL ACTUATION ELEMENT WITH AN ACTUATION ROTATIONAL AXIS

CROSS REFERENCE

This application claims priority to PCT Application No. PCT/EP2023/050587, filed Jan. 12, 2023, which itself claims priority to EU application Ser. No. 22/183,220.7, filed Jul. 6, 2022, and German Patent Application No. 10 2022 101846.6, filed Jan. 27, 2022, the entireties of each of which are hereby incorporated by reference.

FIELD OF THE INVENTION

The invention relates to an accelerator pedal with a rotational position sensor and a pivotal actuation element coupled to a rotor in the rotational position sensor for rotating the rotor in relation to a stator in the rotational position sensor.

BACKGROUND OF THE INVENTION

This accelerator pedal can be used to control an engine in a motor vehicle. DE 10 2008 003 296 B4 discloses an accelerator pedal of this type. The rotational position sensor detects the position of the actuation element and converts this to an electric signal that is sent to an engine control unit to set the momentary engine power output.

The rotor in the rotational position sensor is attached to the actuation element in existing accelerator pedals. The rotor is attached such that the rotational axis of the rotor is aligned with the pivotal axis of the actuation element. The movement of the actuation element is conveyed to the sensor in this manner.

If a driver panics when actuating the accelerator pedal, excessive force may be applied thereto. These forces can damage the accelerator pedal, in particular the actuation element therein. The risk of damage to the accelerator pedal increases as the distance between the position at which the force applied to actuation element and the rotational axis increases. When the position where force is applied is further away from the rotational axis, the torque applied to the accelerator increases.

BRIEF SUMMARY OF THE INVENTION

The invention address the problem of potential damage to the accelerator pedal when stronger actuation forces are applied thereto.

This problem is solved by an acceleration pedal in which: the actuation element for the acceleration pedal can pivot about a pivotal axis, hereinafter referred to as the actuation rotational axis; the rotor in the rotational position sensor can rotate about a rotational axis, hereinafter referred to as the sensor rotational axis; the actuation rotational axis and sensor rotational axis are different axes; and there is a gearing between the actuation element and the rotor, which converts a pivoting of the actuation element into a rotation of the rotor.

With the acceleration pedal obtained with the invention, the movement of the actuation element is not transferred directly to the rotor. The invention contains a gearing that converts the pivotal movement of the actuation element into a rotation of the rotor. The conversion can involve a change in some of the movement values for the pivoting of the actuation element or all movement values for the pivoting of the actuation element into movement values for the rotation of the rotor. The gearing can therefore reduce the forces that could result in damage to the safety-related parts of the accelerator pedal such that they cannot be damaged.

The gearing can contain at least one gearwheel and/or a lever. In a preferred embodiment, the gearing can contain a first lever that is connected to the actuation element for conjoint rotation about the actuation rotational axis. The gearing for the accelerator pedal obtained with the invention can also have a second lever that pivots about the sensor rotational axis, in or on which the rotors in the rotational position sensor can rotate about the sensor rotational axis. The first and second levers can interact with one another such that pivoting of the first lever in a first direction results in pivoting of the second lever. The pivoting of the first and second levers can be restricted. Neither of the two levers needs to be able to execute a complete rotation.

Although it is not necessary, it is particularly convenient if the sensor rotational axis and the actuation rotational axis are parallel. The first and second lever can each have contact surfaces where they come in contact with one another while pivoting, with which a torque or force can be transferred from the first lever to the second.

The accelerator pedal obtained with the invention can have a stop that the second lever strikes when the maximum rotational position thereof has been detected by the rotational position sensor. The stop prevents the rotor from rotating further than necessary in relation to the stator for detecting the position of the actuation element. The stop can also prevent damages caused by excessive actuation of the acceleration pedal.

The stop can be positioned such that forces conveyed to the second lever from the first when the maximum rotational position of the rotational position sensor has been reached can be absorbed by the stop, without exerting a torque on the second lever that could damage the second lever. The force conveyed from the first lever to the second can then be deflected to the stop without damaging the second lever.

The actuation element and first lever can be connected via a pivot axle. This pivot axle can be an integral part of the actuation element, or it can be connected thereto for conjoint rotation. It can also be connected to the first lever for conjoint rotation.

The actuation element or the actuation element and pivot axle can be replaceable. This is important if the actuation element or pivot axle need to be replaced. It also has advantages if an acceleration pedal is needed that has different actuation elements or pivot axles for different uses. Different actuation elements and/or pivot axles can be selected to readily obtain an entirely new version of an accelerator pedal.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
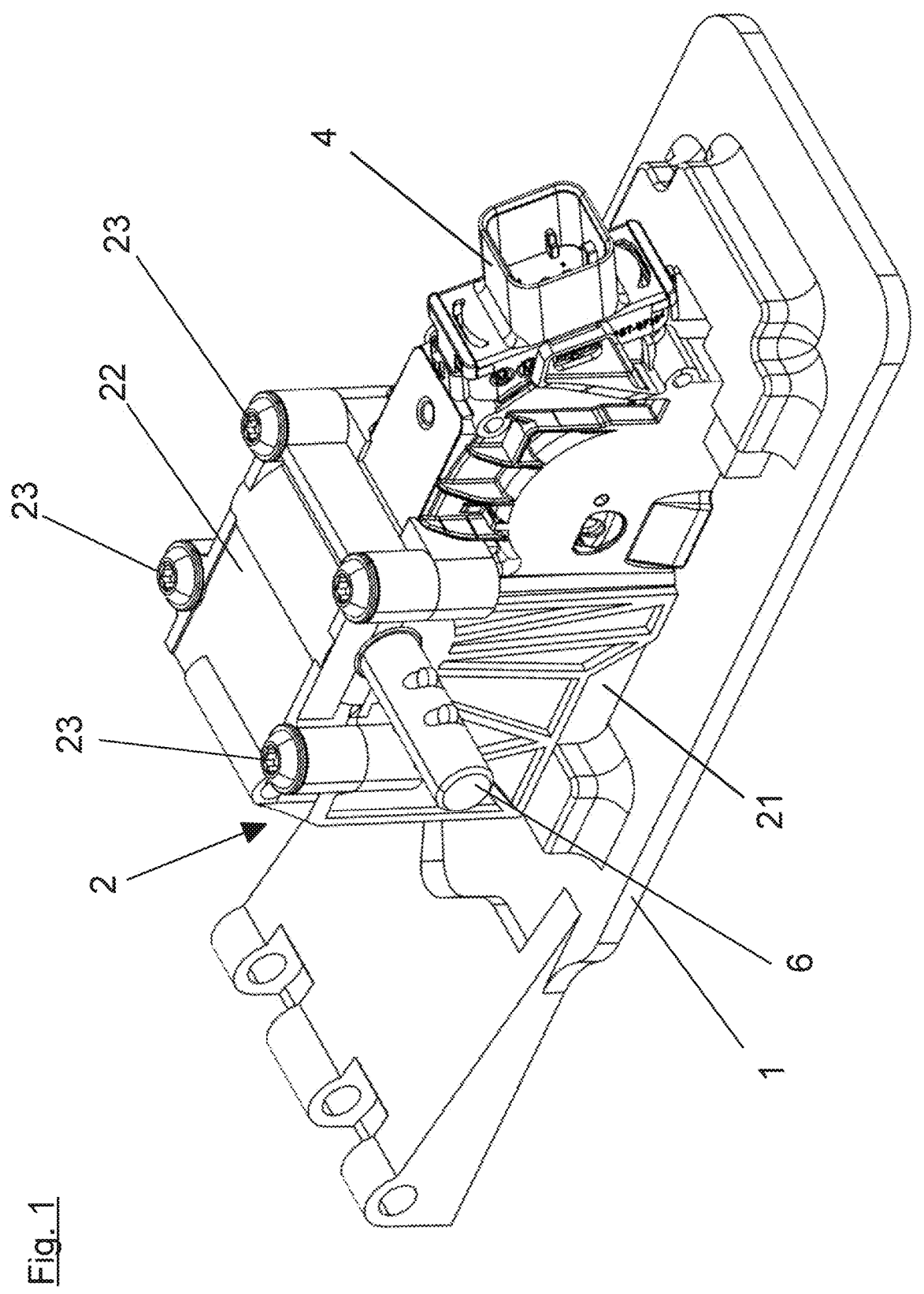
FIG. 1 shows a first exemplary embodiment in a perspective view.
Figure 1A:
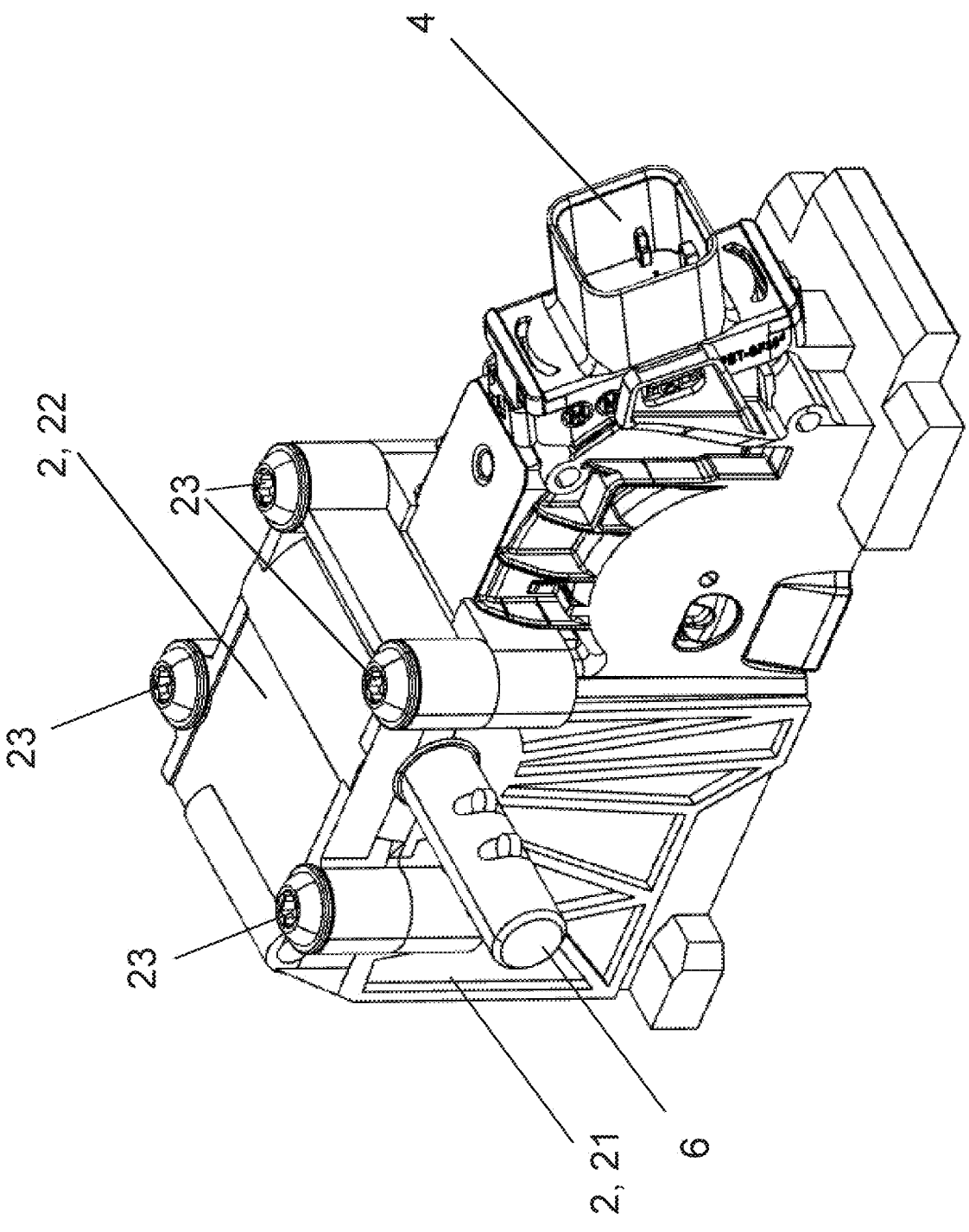
FIG. 1A shows the first exemplary embodiment from the same perspective, but without the bottom.
Figure 1B:
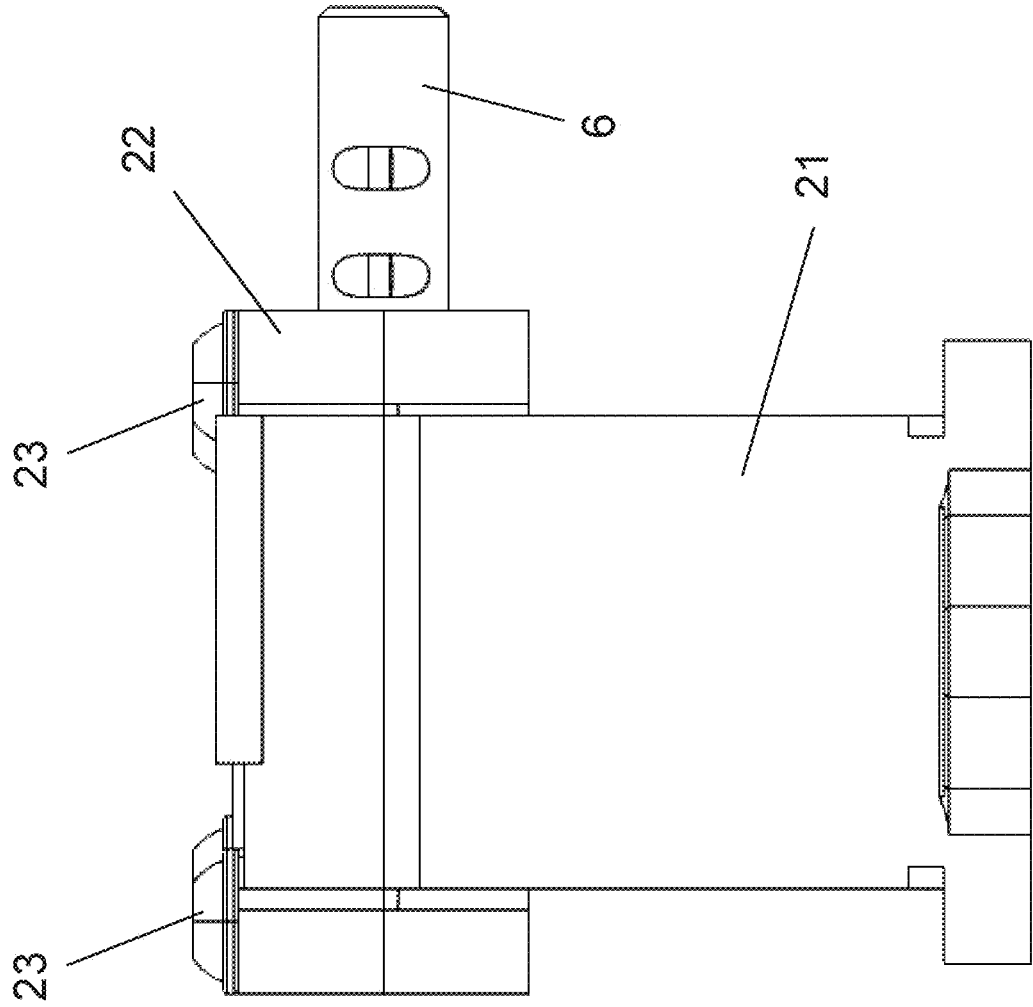
FIG. 1B shows the first exemplary embodiment, without the bottom, from the front.
Figure 1B:
Figure 1C:
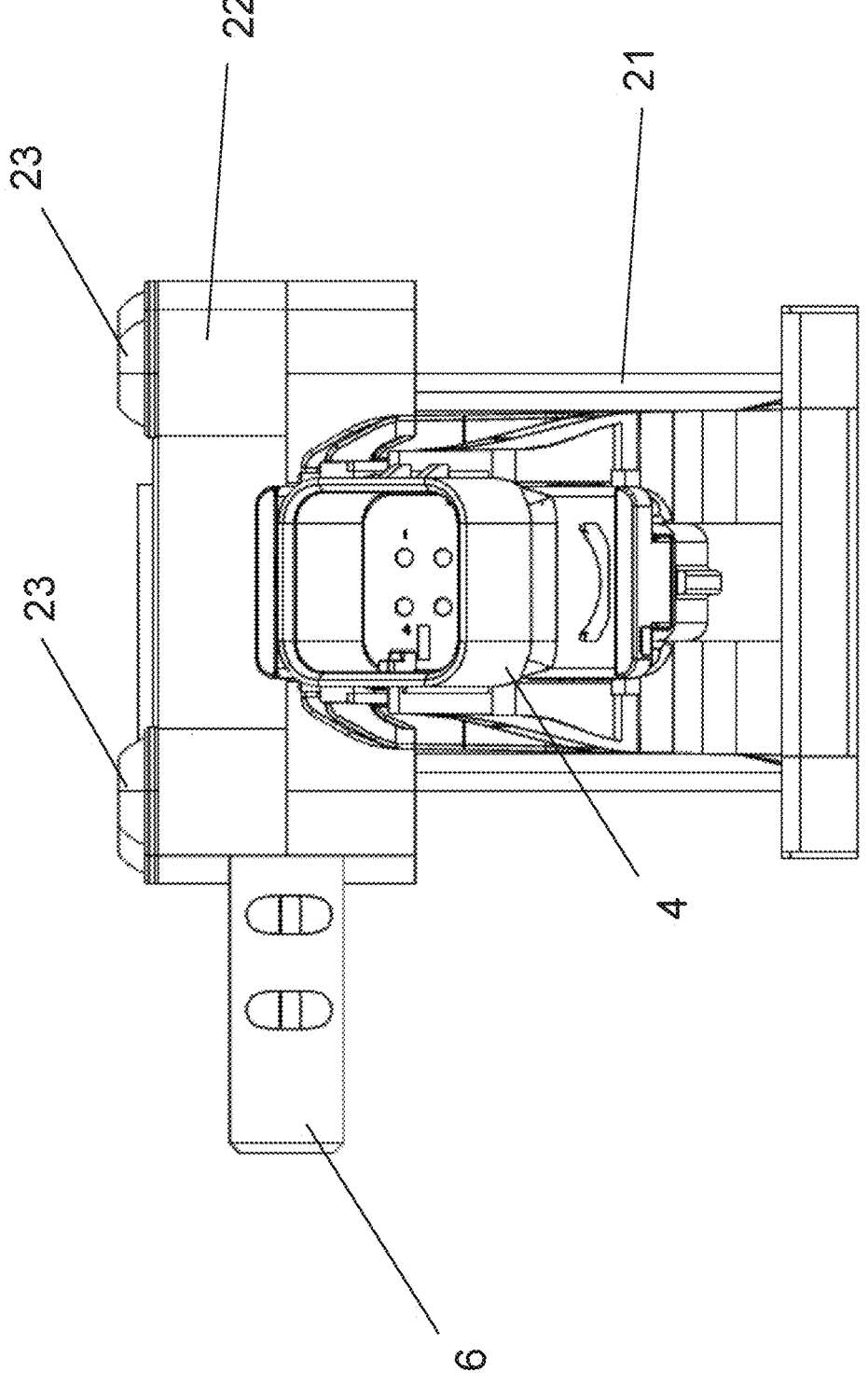
FIG. 1C shows the first exemplary embodiment, without the bottom, from the back.
Figure 1D:
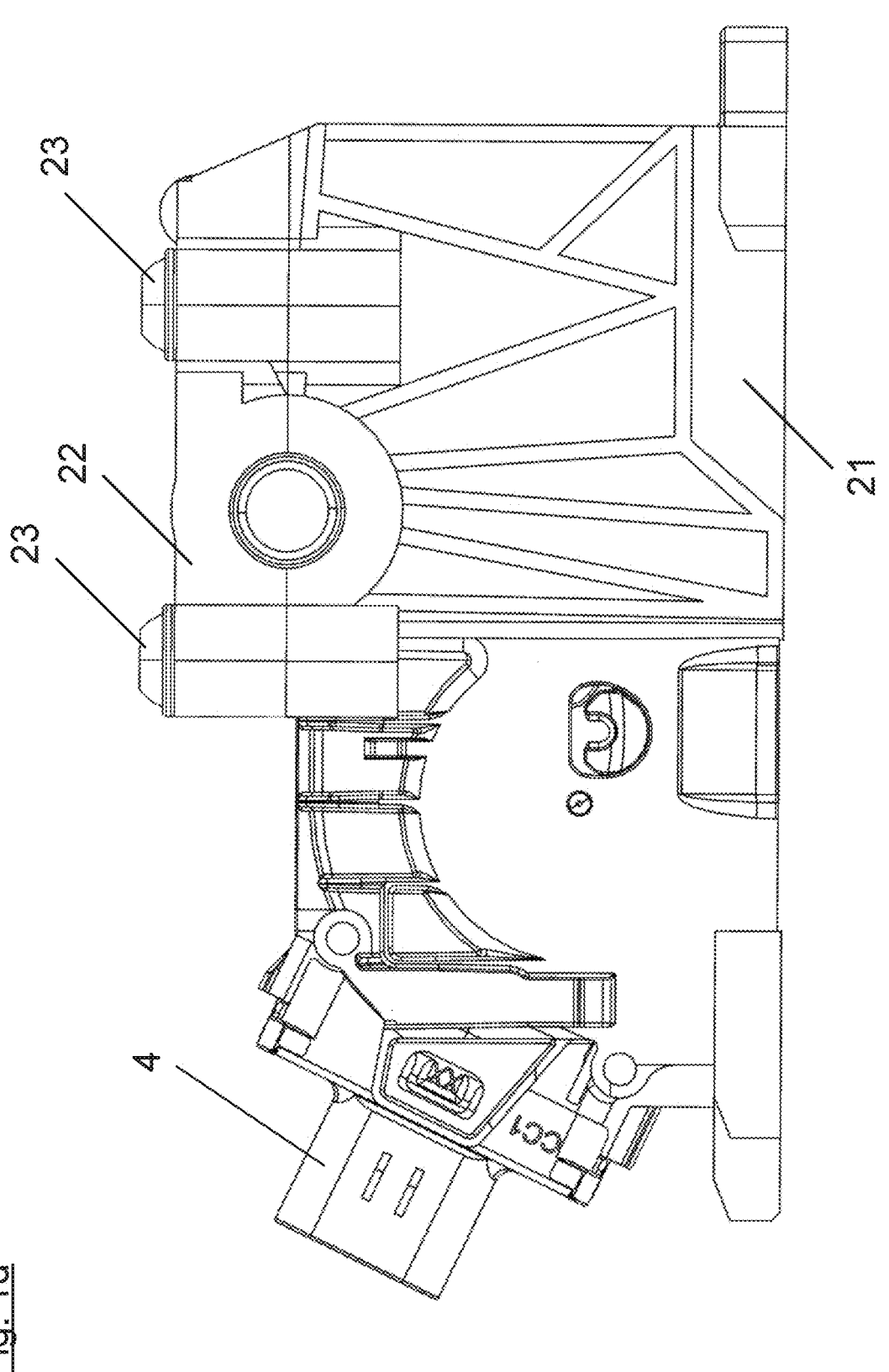
FIG. 1D shows the first exemplary embodiment, without the bottom, from a first side.
Figure 1E:
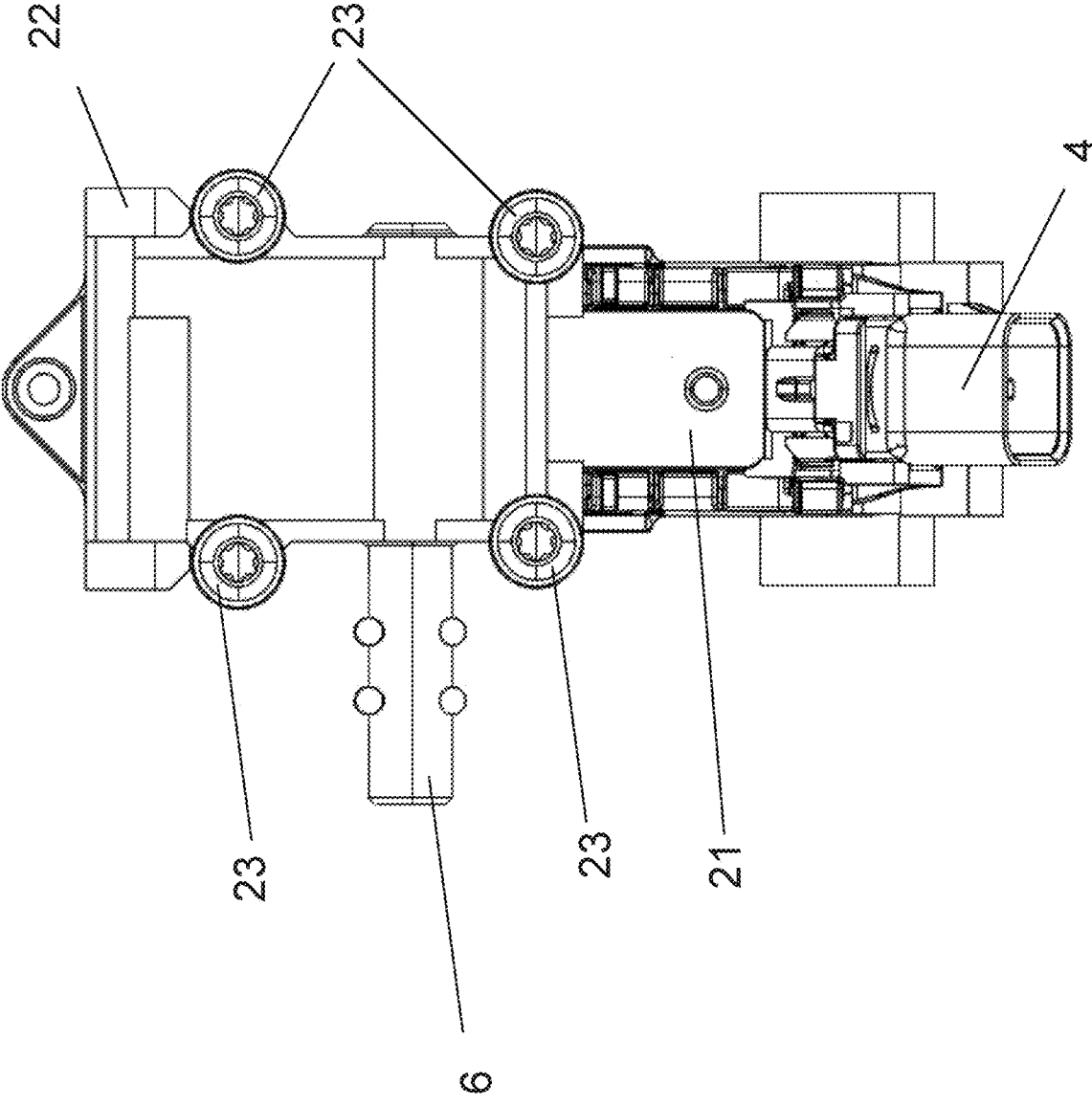
FIG. 1E shows the first exemplary embodiment, without the bottom, from above.
Figure 1F:
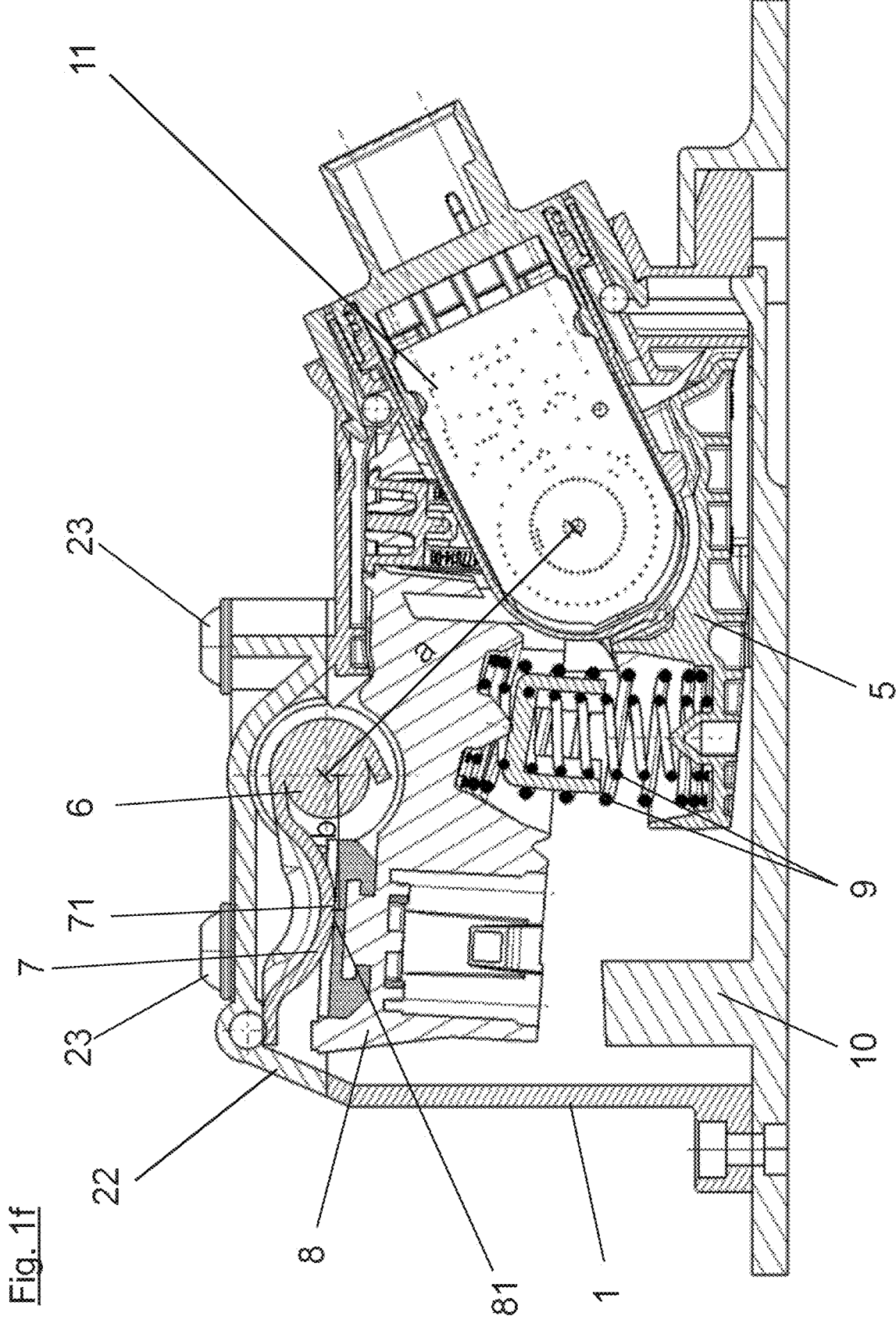
FIG. 1F shows a section of the first exemplary embodiment, without the bottom.
Figure 1G:
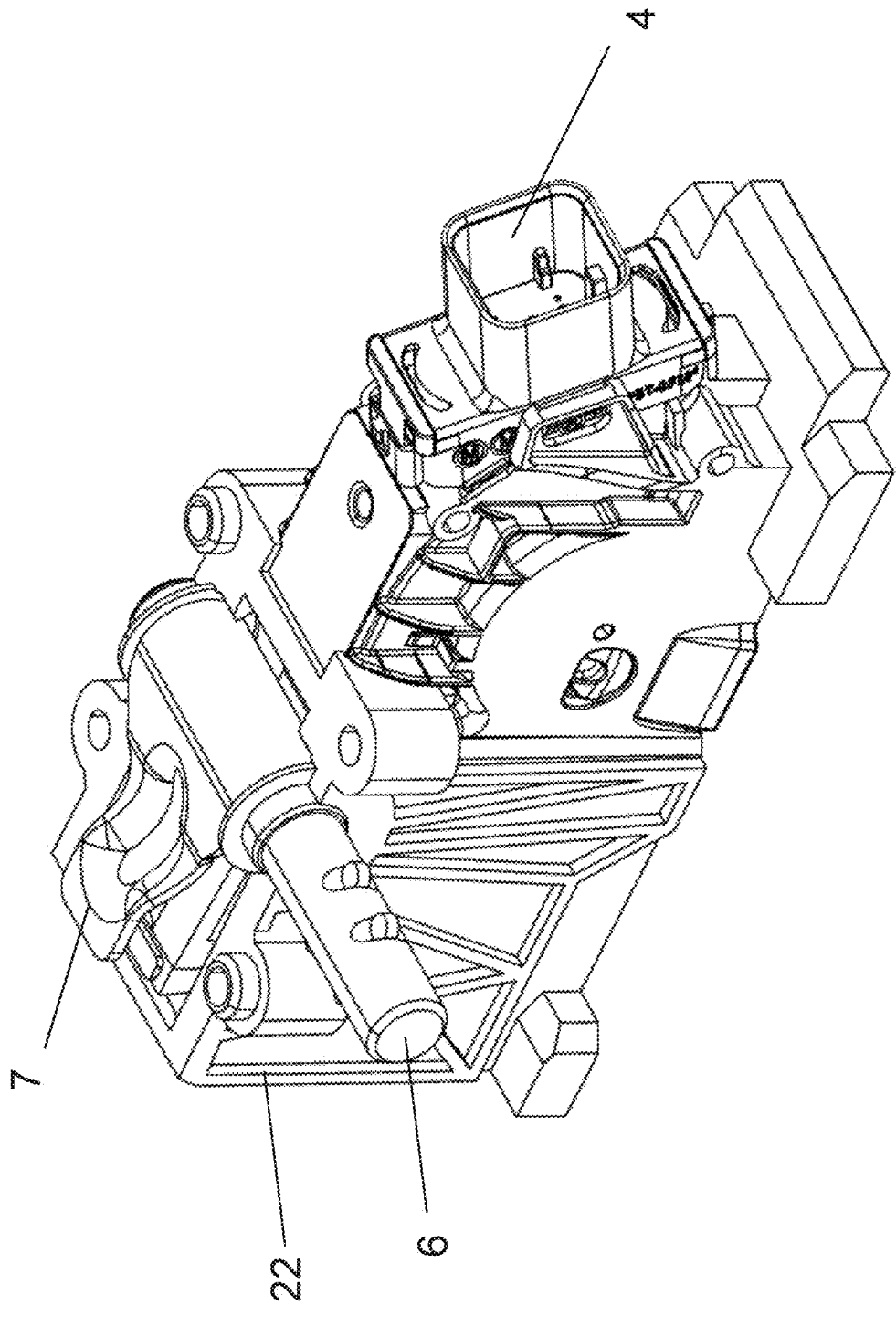
FIG. 1G shows the same perspective shown in FIGS. 1 and 1A, but without the bottom and upper housing shell and threaded fasteners with which the upper housing shell is attached to the lower housing shell.
Figure 2:
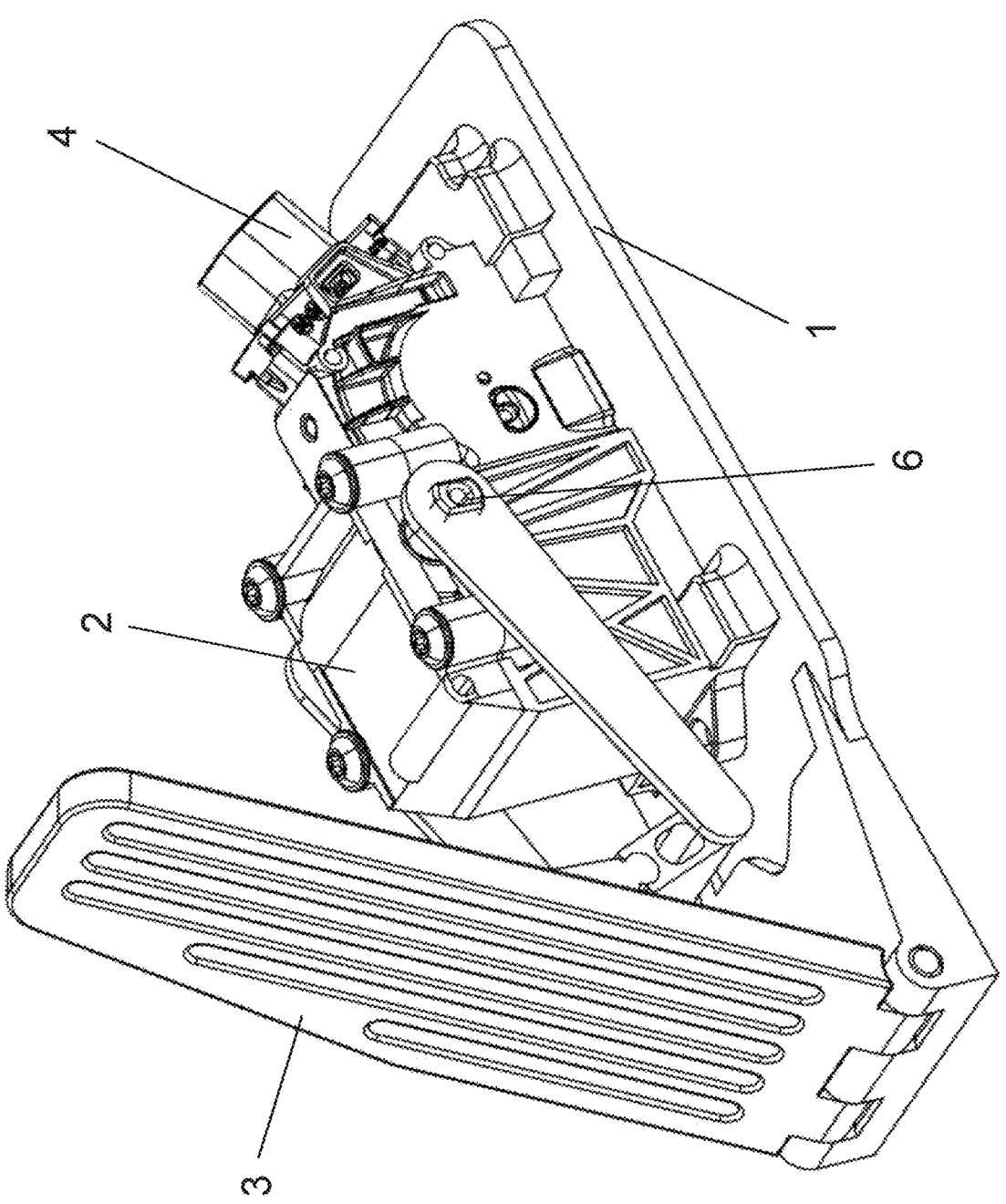
FIG. 2 shows a first variation of the first exemplary embodiment in a perspective view.
Figure 3:
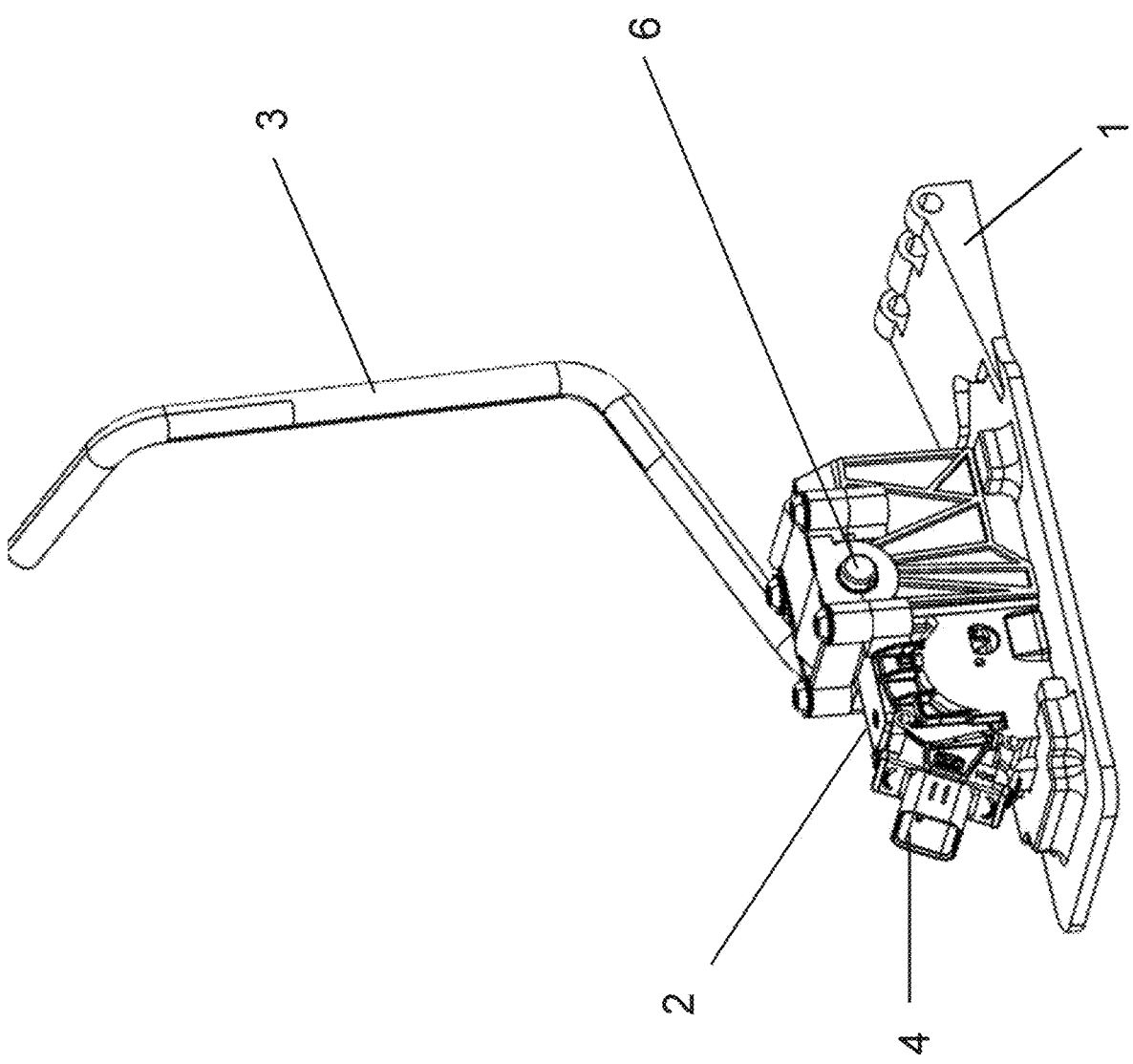
FIG. 3 shows a second variation of the first exemplary embodiment in a perspective view.
Figure 4:
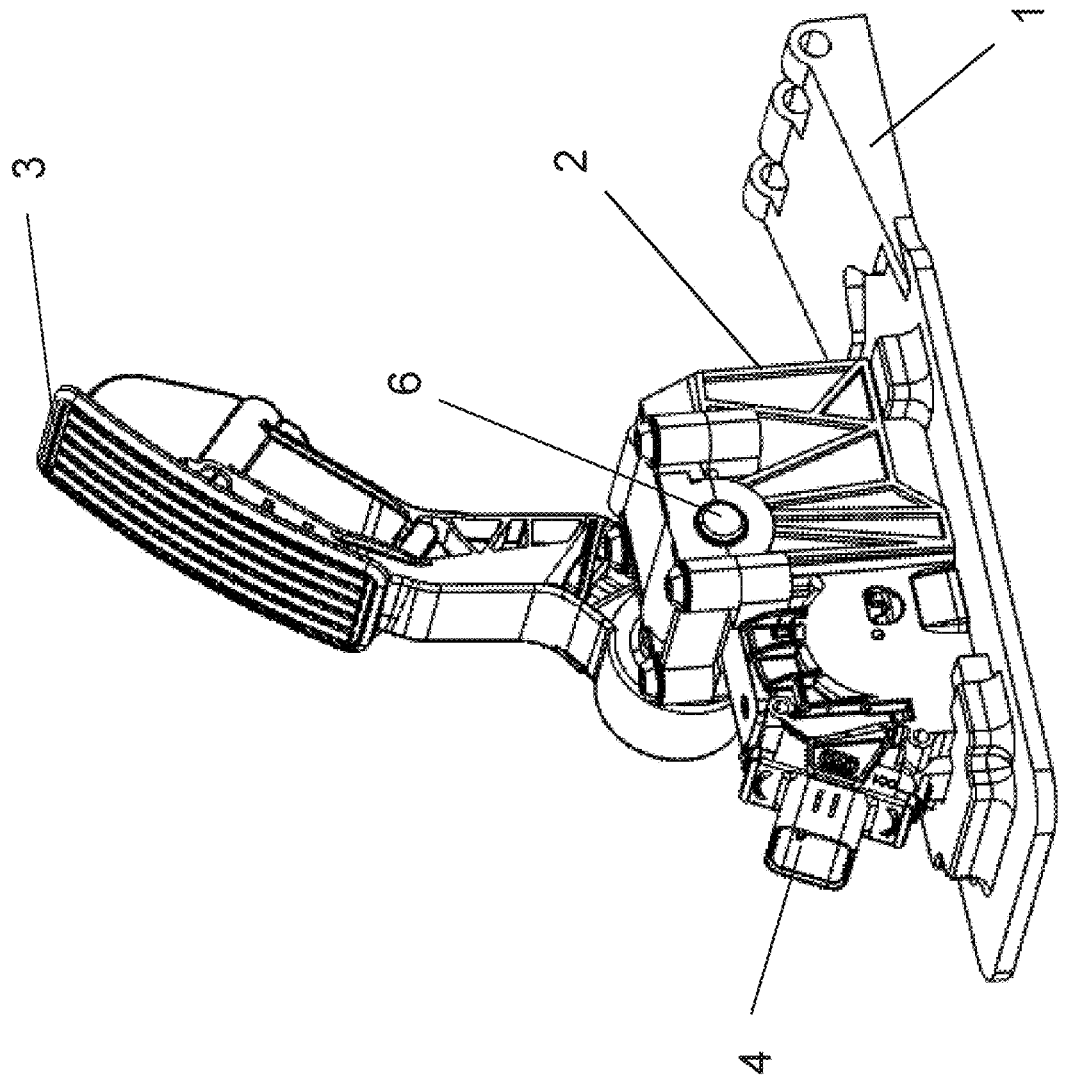
FIG. 4 shows a third variation of the first exemplary embodiment in a perspective view.
Figure 5:
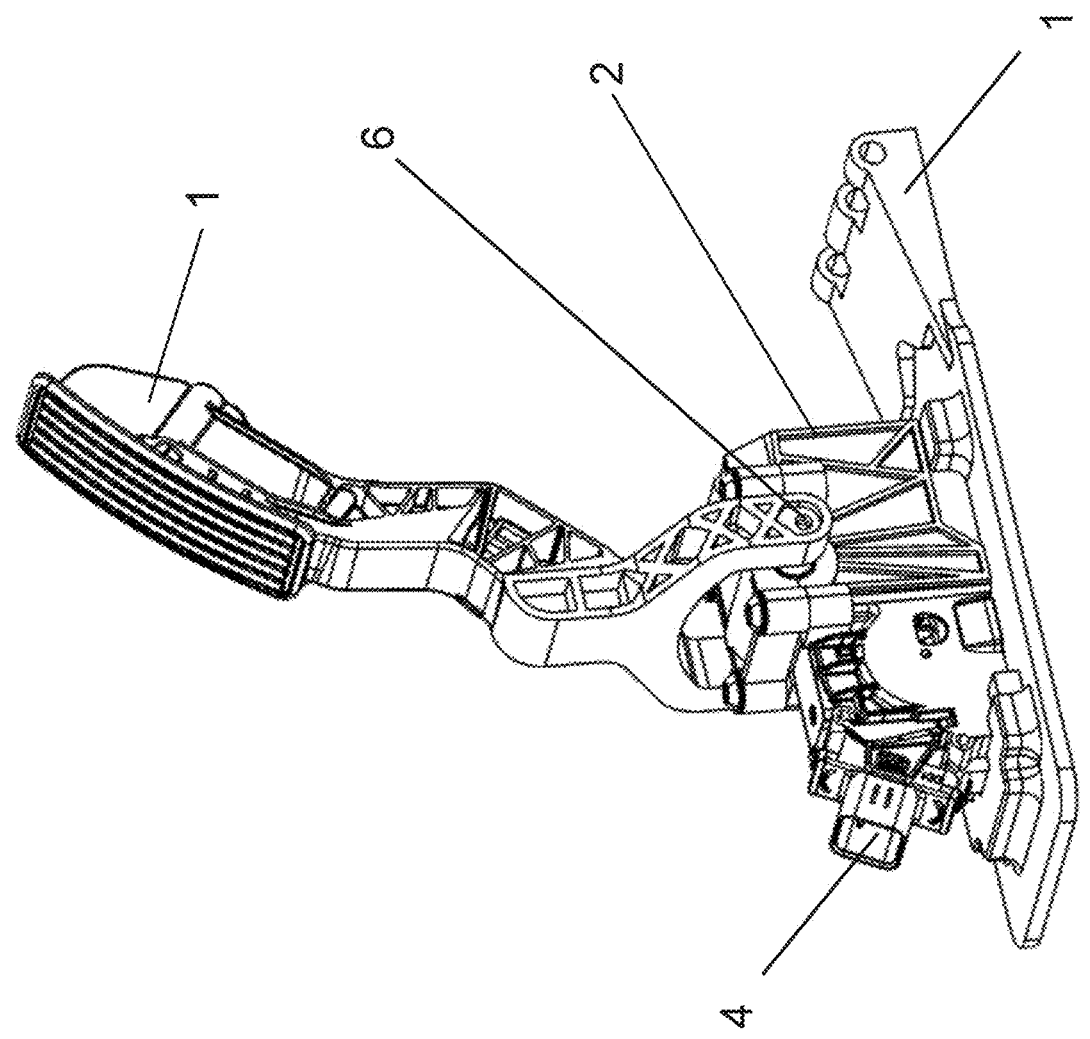
FIG. 5 shows a fourth variation of the first exemplary embodiment in a perspective view.
Figure 6:
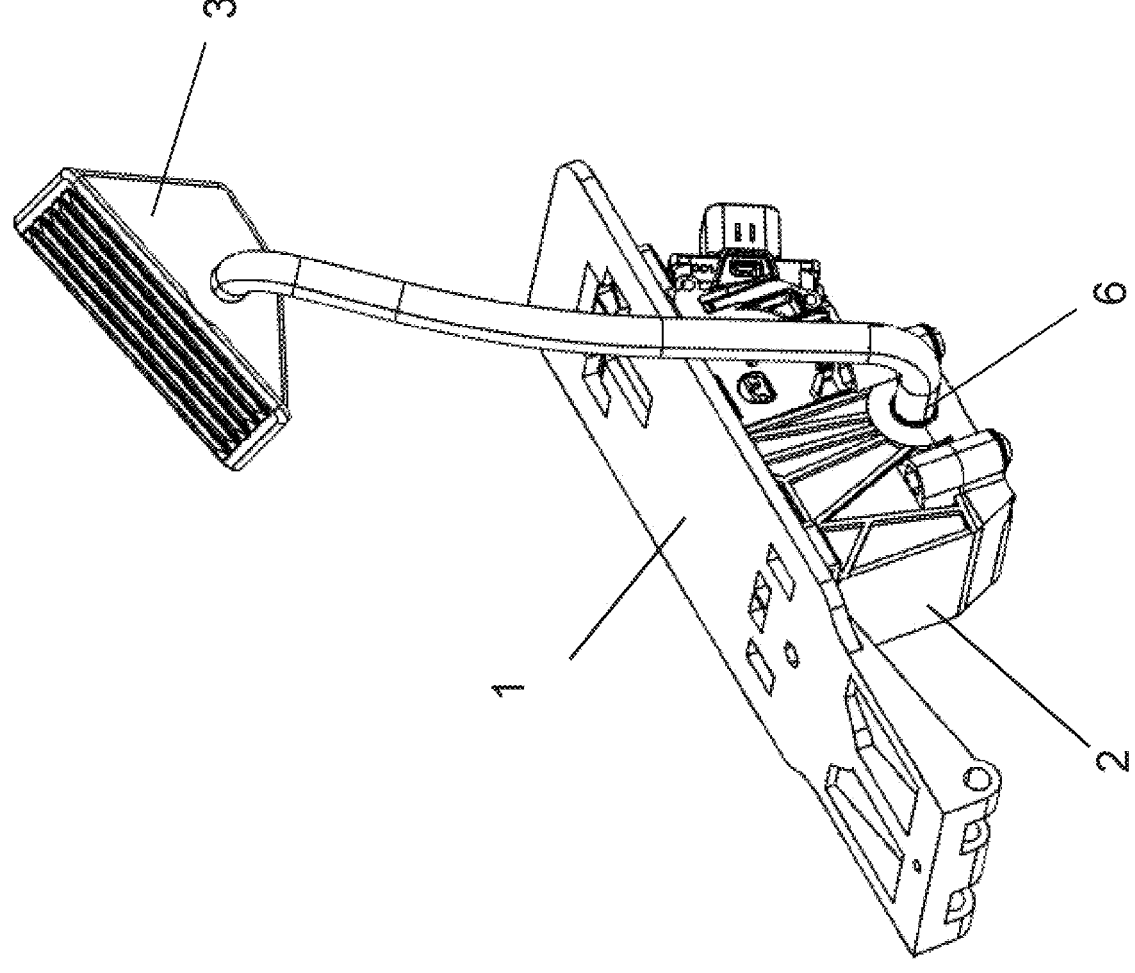
FIG. 6 shows a fifth variation of the first exemplary embodiment in a perspective view.

The exemplary embodiments of accelerator pedals obtained with the invention shown in the drawings are based on a prior accelerator pedal disclosed in DE 10 2008 003 296 B4. The exemplary embodiments contain many of the same functionally identical elements. The first exemplary embodiment shall be explained first, and the differences between the variations of the first exemplary embodiment shall then be explained before the differences between the first and second exemplary embodiments are explained.

The exemplary embodiments have a bottom 1 and a housing 2. Most of the rest of the elements of the accelerator pedal are in or on the housing. They include an actuation element 3, which is pivotally supported in and extends out of the housing 2. The actuation element is not shown in the first exemplary embodiment.

The exemplary embodiments also contain a socket 4 for an electrical plug, which is in a recess in the housing 2, and protrudes therefrom.

There is a rocker 5 in the housing that can pivot about a pivotal axis. This rocker 5 can only pivot a few degrees. In the present invention, the rocker is of subordinate importance. This rocker is explained in greater detail in prior applications by the applicant, e.g. DE 10 2008 003 296 B4. A stator for a rotational position sensor 11 for the accelerator pedal is attached to the housing 2. It is snapped into the socket 4, and sealed by a protective sleeve. The sensor 11 has an axis that is aligned with the pivotal axis of the rocker. This rotational axis is referred to below as the sensor rotational axis. Rotations of a rotor about this axis can be detected by the sensor 11. These rotations are converted to an electric signal. The sensor 11 is connected to contacts in the socket. The electric signal from the sensor 11 can be output from the socket.

The housing 2 forms a bearing for the actuation element 3, a pivot axle 6, and a first lever 7. The actuation element 3 and the first lever 7 are connected via the pivot axle 6 for conjoint rotation. The pivot axle 6 is what is rotationally supported in the bearing formed by the housing 2. The rotational axis of the pivot axle 6 is referred to as the actuation rotational axis, because the actuation element 3 pivots about this rotational axis.

Figure 7:
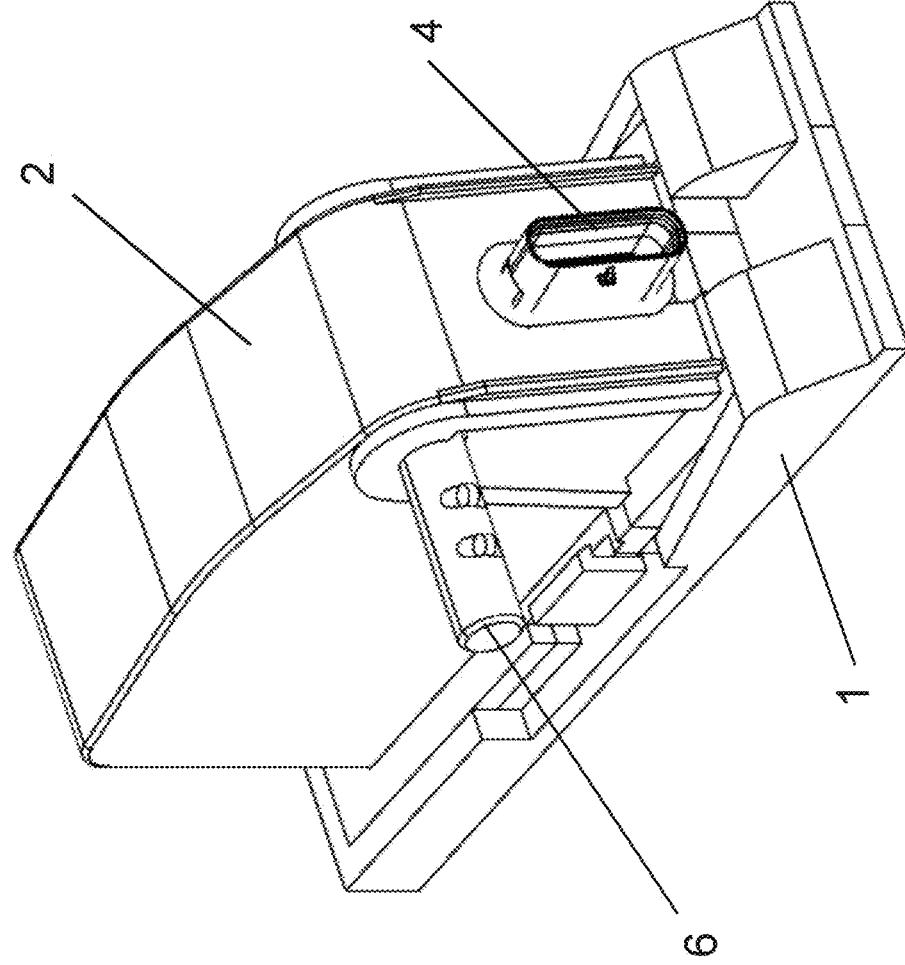
FIGS. 7 and 7A-7C show second exemplary embodiments.
Figure 7A:
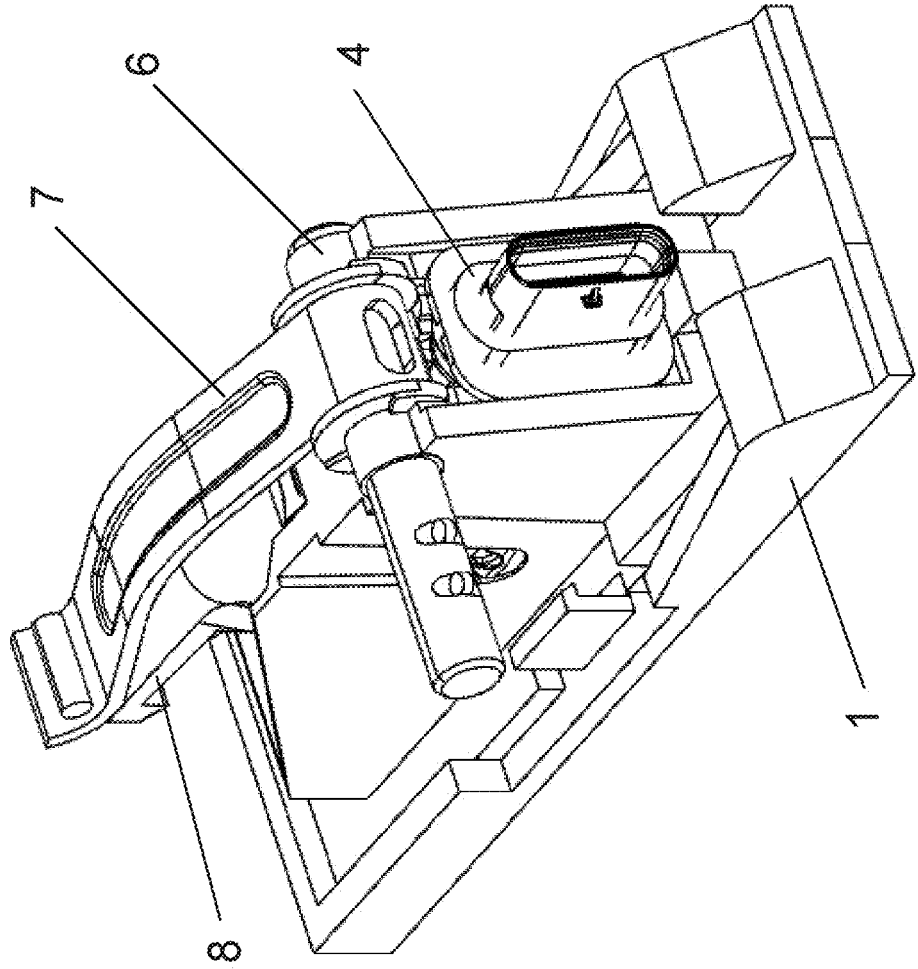
Figure 7B:
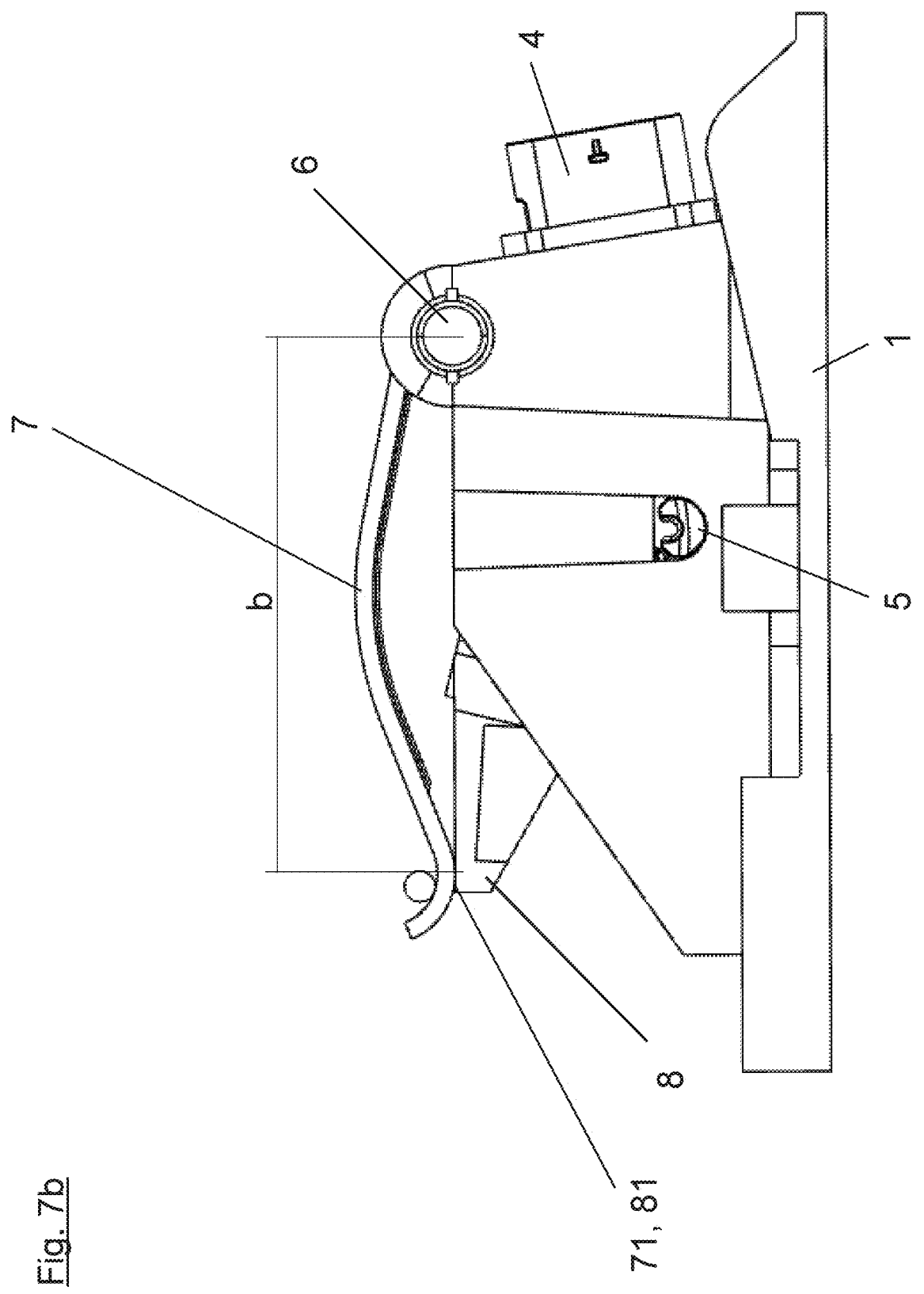
Figure 7C:
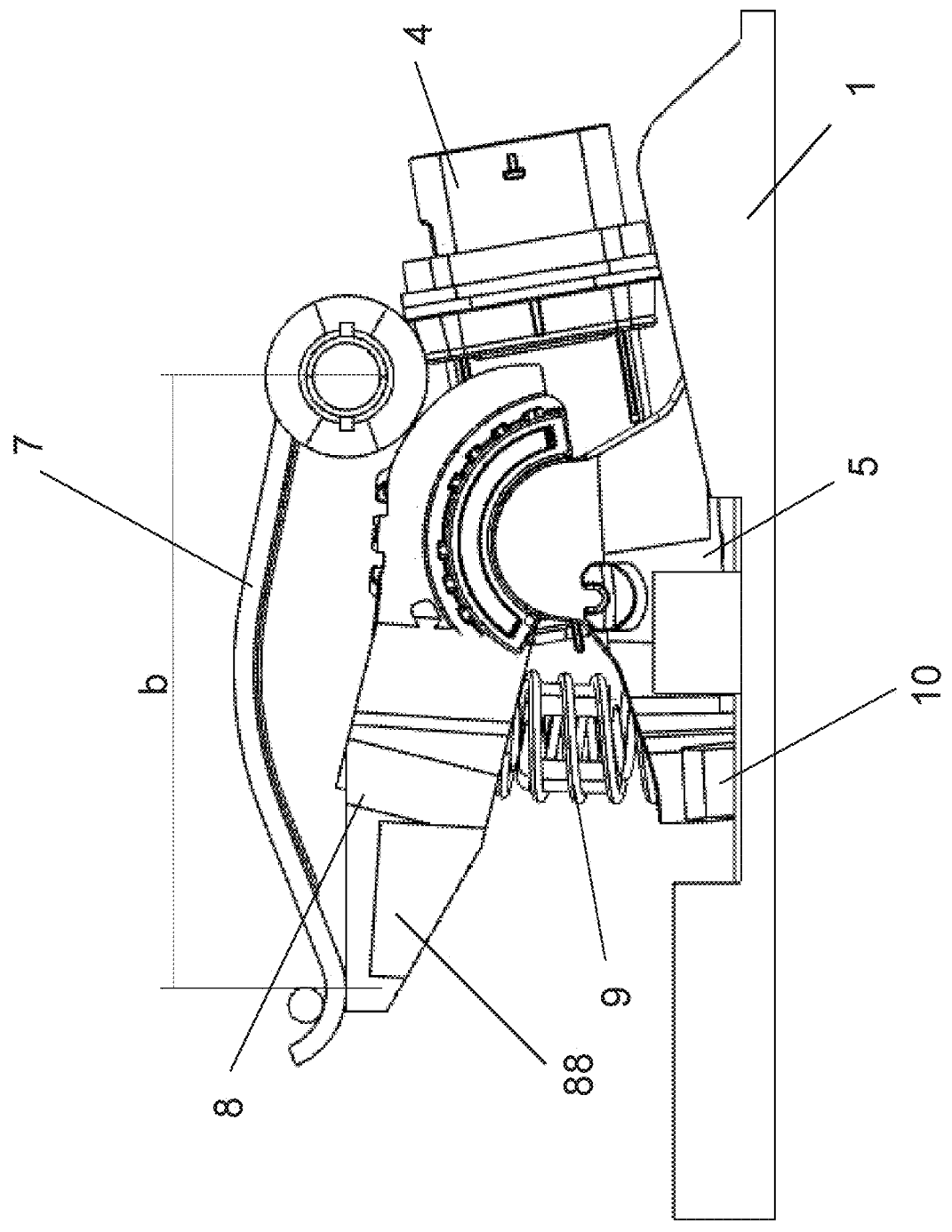

The rocker 5, together with the housing, forms a bearing for a second lever 8. The rocker 5 forms a lower, round bearing shell, and the housing forms an upper, round half-shell. There are round bearing elements in the bearing. The pivotal axis of this bearing for the second lever is aligned with the sensor rotational axis. A rotor for the sensor is attached to the second lever 8. This is shown in FIG. 7c.

There are one or more return springs 9 between the rocker and the second lever 8, with which the second lever 8 can be returned to its starting position.

The sensor axis and actuation axis are spaced apart and parallel to one another. The first lever 7 and second lever 8 are placed such that they interact with one another. When the first lever 7 pivots, it moves the second lever 8. There are contact surfaces 71, 81 on each of the levers 7, 8. The first lever 7 bears at its contact surface 71 on the contact surface 81 of the second lever 8, and vice versa. Forces can be transferred from the first lever 7 to the second lever 8 and from the second lever 8 to the first lever 7 through the contact at the contact surfaces 71, 81.

The first lever 7 pivots from a starting position in a first direction when a user applies force to the actuation element 3 of the acceleration pedal. This force is transferred to the first lever 7. It can then be conveyed from there to the second lever. The amount of force transferred to the second lever 8 is determined by the distance between the point where the user applies force to the actuation element 3 and the actuation axis, and the distance between the point or surface where the contact is obtained between the first lever 7 and the second lever 8 and the actuation axis.

The first lever 7 pivots in the opposite direction when the user releases the actuation element 3 and the springs 9 push the second lever 8 back into its starting position. The force exerted by the springs 9 on the second lever 8 is transferred to the first lever 7, thus returning the actuation lever back to its starting position.

In particular, the amount of force exerted by the first lever 7 on the second lever 8 can be determined by the length of the first lever 7, or the distance b between the actuation axis and the contact surface on the first lever in relation to the length of the actuation element. By increasing the distance b between the actuation axis and the contact surface on the first lever 7, the force exerted by the first lever 7 on the second lever 8 can be reduced when the same amount of force is exerted on the actuation element 3.

There is also a stop 10 for the second lever 8. This limits the movement of the second lever and therefore also that of the rotor connected thereto in relation to the stator. The stop is placed on the bottom part 1. The stop is placed such that force exerted by the first lever 7 on the second lever 8 can be absorbed by the stop 10. The stop 10 is place on the side of the second lever 8 furthest away from where the force is exerted on the second lever 8. When the second lever 8 strikes the stop, any further force exerted on the second lever 8 can be deflected to the stop 10, without resulting in torques in the second lever 8 that act on the second lever 8 or the bearing for the second lever 8.

The housing 2 is made of two parts in the first exemplary embodiment, one of which forms a lower housing shell 21 while the other forms the upper housing shell 22, which are joined to one another with threaded fasteners 23. The pivot axle 6 is placed between these two housing shells 21, 22. They have semicircular recesses formed therein for the pivot axle 6.

The accelerator pedal can contain a kickdown element, with which the vehicle can be quickly accelerated, in particular in vehicles with an automatic transmission, when the accelerator pedal is quickly and powerfully actuated. The kickdown element can be snapped into a slot 88 formed in the second lever 8, and is actuated when the accelerator pedal is pushed all the way down.

LIST OF REFERENCE SYMBOLS

1 bottom
2 housing
21 lower housing shell
22 upper housing shell
23 threaded fasteners
3 actuation element
4 socket
5 rocker
6 pivot axle
7 first lever
71 contact surface
8 second lever 8
81 contact surface
88 slot for the kickdown element
9 return springs
10 stop
11 rotational position sensor

The invention claimed is:

1. An accelerator pedal comprising:

a rotational position sensor rotatable about a sensor rotational axis;

an actuation element pivotal about an actuation rotational axis in response to a force applied by a user;

a first lever connected to the actuation element and configured to rotate when the actuation element pivots in response to the force applied by the user; and a second lever connected to first lever and the rotational position sensor, the second lever configured to rotate in response to rotation of the first lever, wherein the actuation rotational axis and the sensor rotational axis are different axes, and wherein the first lever and the second lever are operatively connected between the actuation element and the rotational position sensor and are cooperable to convert pivoting of the actuation element into rotation of the rotational position sensor in response to the force applied by the user to the actuation element.

2. The accelerator pedal according to claim 1, wherein the first lever and second lever interact via contact between the first lever and the second lever, such that pivoting of the first lever in a first direction causes the second lever to pivot.

3. The accelerator pedal according to claim 2, wherein the sensor rotational axis and the actuation rotational axis are parallel, and the first lever and second lever each have contact surfaces at which the levers come in contact when pivoting against one another, and via which a torque can be transferred from the first lever to the second lever.

4. The accelerator pedal according to claim 3, further including a stop that the second lever strikes when a maximum rotational position is detected by the rotational position sensor, wherein the stop is placed such that force from the first lever, when the maximum rotational position of the rotational position sensor has been reached for the second lever, is absorbed by the stop without exerting a torque on the second lever that would damage it.

5. The accelerator pedal according to claim 1, wherein the actuation element and first lever are connected via a pivot axle that is an integral part of the actuation element or is connected to the actuation element for conjoint rotation, wherein the pivot axle is configured to convert pivoting of the actuation element into rotation of the first lever.

6. The accelerator pedal according to claim 1, wherein the actuation element is replaceable.

7. The accelerator pedal according to claim 1, wherein the first lever and the second lever move from a first position to a second position to convert pivoting of the actuation element into rotation of the rotational position sensor in response to the force applied by the user to the actuation element, and wherein the first lever and the second lever are biased to the first position such that the first lever and the second lever return to the first position when the force is released from the actuation element.

* * * * *